Aug. 11, 1953   J. F. HAINES ET AL   2,648,388
AIRCRAFT PROPELLER
Filed Jan. 26, 1951
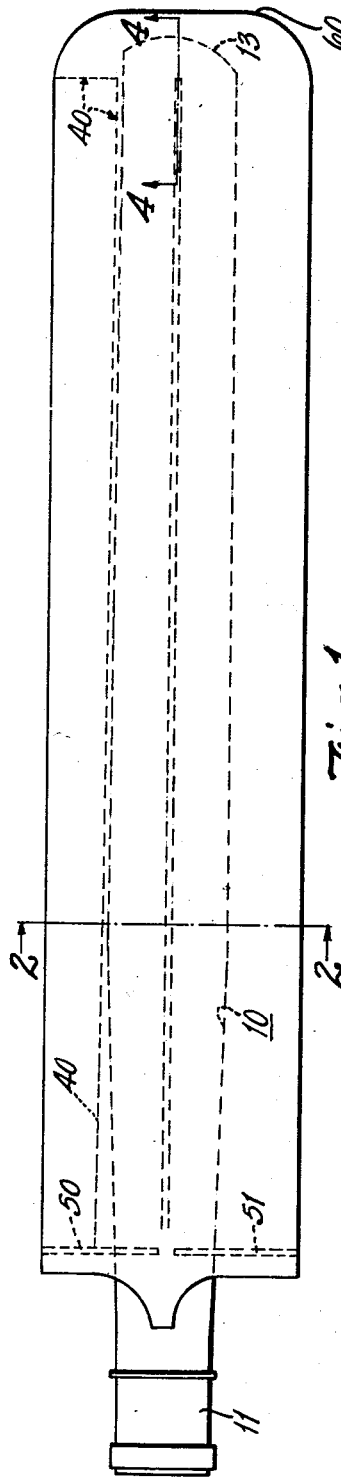
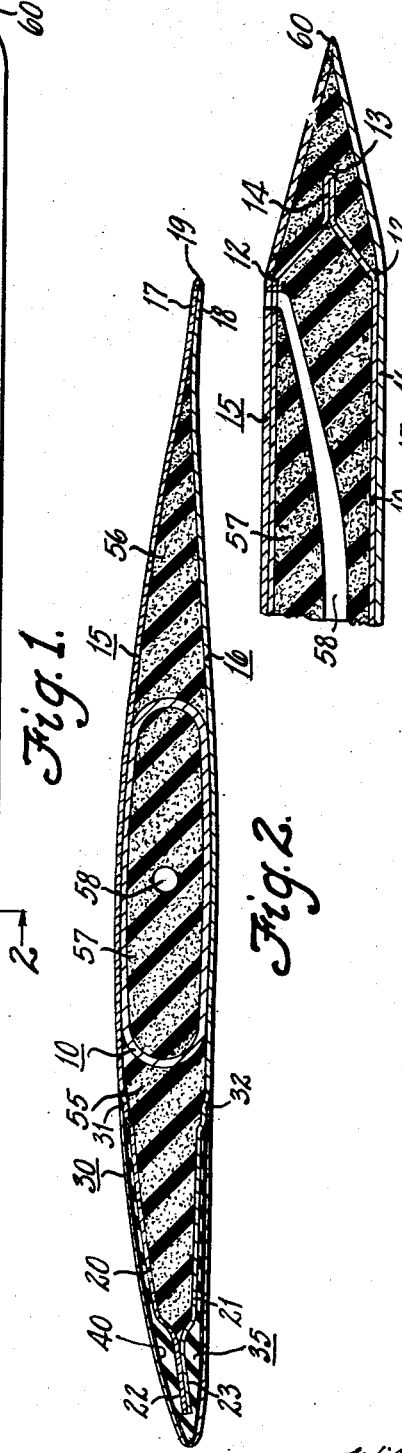
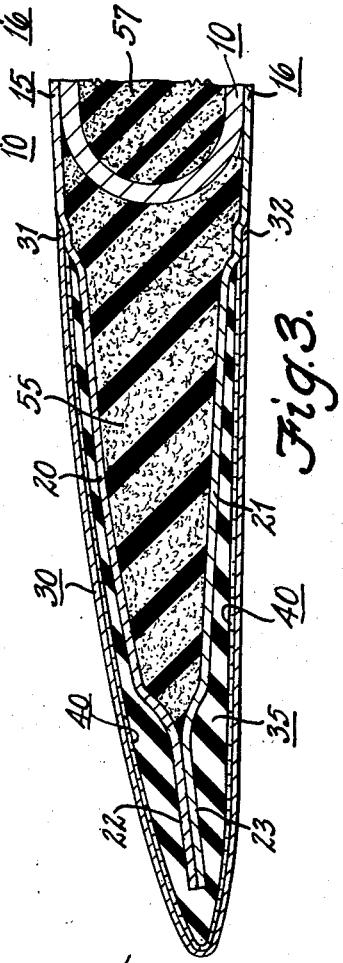
INVENTOR
JOHN F. HAINES
CLIFFORD B. WRIGHT
their ATTORNEYS Patented Aug. 11, 1953

2,648,388

UNITED STATES PATENT OFFICE 2,648,388

AIRCRAFT PROPELLER

John F. Haines and Clifford B. Wright, Dayton, Ohio, assignors to General Motors Corporation, Detroit, Mich., a corporation of Delaware Application January 26, 1951, Serial No. 207,946

3 Claims. (Cl. 170—159)

This invention relates to airplane propeller blades having built-in anti-icing means.

An object of this invention is to provide an efficient form of propeller blade having great rigidity and strength for its thickness, and having built-in anti-icing means for reducing or preventing formation of ice thereon during flight.

Important features of the blade of this invention include the following:

The main metal sheath which outlines the major portion of the air foil section of the hollow blade has its leading edge portions indented or deformed inwardly from the desired air foil section of the leading edge. A separate erosion-resisting metal shell or nose-piece (preferably of stainless steel) overlies and embraces the inwardly-deformed portion of said main sheath but is spaced therefrom and provides a cavity between said deformed portions and nose-piece. Located within this cavity in good heat-conducting relation with the inside surface of said metal nose-piece is an insulated electric resistance element in sheet form for heating said nose-piece while in flight to reduce or prevent the formation of ice thereon. Preferably this cavity is filled with non-conductive resilient rubber or other cushioning plastic body under some compression so that the insulated electric heating element will be retained in pressure contact with the inside surface of said nose-piece and thereby increase heat conduction between the heating element and nose-piece. Also such resilient rubber filling within said cavity will strengthen and render more rigid the air foil shape of the nose-piece. Preferably the nose-piece is formed from stainless sheet steel of such hardness and gauge that it will withstand over long periods of use the usual abrasions or denting forces normally encountered in use. However, if said separate nose-piece becomes damaged from wear or accident, the design is such that it can be quite readily removed from the main blade structure and replaced by a new nose-piece without rebuilding the entire blade.

Other objects and advantages of the invention will be apparent from the drawings and following description.

In the drawings:

Fig. 1 is a developed plan form of one blade of a variable pitch propeller made according to this invention.

Fig. 2 is a section taken on line 2—2 of Fig. 1, on an enlarged scale.

Fig. 3 shows on a still further enlarged scale the forward portion of Fig. 2 to show more clearly the electric heating element.

Fig. 4 is a section taken on line 4—4 of Fig. 1, on an enlarged scale.

Similar reference characters refer to similar parts throughout the several views.

The main strength member or strut 10 of the blade is a relatively strong steel tapered tubular member having a round section hub end 11 but flattened into an oval section over its greater length. This oval section is gradually reduced in depth from the hub end 11 to the outer end of the blade. The upper and lower surfaces of strut 10 (as viewed in Fig. 2) conform with the inside surfaces of the overlying metal sheaths which provide the desired air foil section to the blade. The blade itself of course is thickest near the propeller hub and thinnest at its outer end. In Fig. 1 strut 10 is shown as having maximum width approximately at line 2—2 at which Fig. 2 is taken. From this line 2—2 to point 12 adjacent its tip 13 the strut 10 is gradually reduced in thickness, but its width remains substantially constant due to the taper of the originally round steel tube, as shown in Fig. 1. At the outer end of strut 10, the upper and lower sides of the oval section of the strut are pressed into contact and welded together along the meeting line 14 (as shown in Fig. 4) to fully close the interior of the strut. The upper and lower surfaces of strut 10 are shaped to conform with and lie against the main upper air foil sheath 15 and the main lower air foil sheath 16 respectively, and are rigidly fixed thereto as by soldering or welding. The trailing edges 17 and 18 of sheaths 15 and 16 respectively directly contact one another and are fixed together (as by soldering or welding) and then ground to form the relatively sharp trailing edge 19 of the blade.

But the leading edge portions 20 and 21 of sheaths 15 and 16 are indented or deformed inwardly to a smaller contour than the desired final air foil section of the leading edge of the blade, as shown in Fig. 2, and their forward margins 22 and 23 which lie in mutual contact are rigidly fixed together as by welding or soldering. The permanently assembled structure so far described provides the main strength and rigidity to the blade and gives an especially strong and rigid interior structure to the blade.

Now according to this invention, a separately formed nose-piece 30 preferably of stainless steel of suitable gauge and hardness, embraces the inwardly deformed portions 20 and 21 of sheaths 15 and 16 respectively and completes the desired air foil section of the leading edge portion of the blade. This stainless steel nose-piece 30 may be fixed rigidly in place where its upper and lower margins 31 and 32 overlap suitably indented portions of sheaths 15 and 16 by soldering or otherwise fixing these overlapping portions together as by a rubber cement bond. Such a nose-piece 30 has great abrasion-resisting and dent-resisting properties and is thus located on the propeller blade in position to take substantially all such damage occurring in use, hence will greatly increase the useful life of the propeller. Also if the nose-piece 30 be damaged it may be quite readily removed from the main blade structure and replaced by another nose-piece without rebuilding the entire blade or scrapping same.

The space between nose-piece 30 and the embraced portions 20, 21, 22 and 23 of sheaths 15 and 16 is preferably filled with a suitable resilient filling material 35 such as a cellular rubber or plastic composition retained in place under suitable compression. The filling material 35 may be first molded to the desired shape and size (with reinforcing fabric therein if so desired) and then this preform may be inserted over the projecting portions 20 and 21 and strongly cemented thereto prior to the assembling of nose-piece 30 upon the blade.

The insulated electric heater element 40 in the form of a flexible sheet lies directly against the inside surfaces of nose-piece 30 and may be cemented in place to said surfaces prior to assembling the nose-piece to the sheaths 15 and 16 as above described. Such heater elements 40 in sheet form are well known wherein Nichrome resistance wires are embedded in a flexible sheet of insulating rubber or other composition. The heating wires in element 40 may be uniformly distributed over the area thereof, or be otherwise arranged to give any desired distribution or concentration of heat over the different areas of the nose-piece 30. It will be noted that the pressure contact of heater element 40 against the inside surface of nose-piece 30 will facilitate rapid heat transfer therebetween and hence result in greater heating efficiency. The electric current may be supplied to element 40 through conductors leading from a relatively stationary source such as a storage battery through suitable slip rings to the rapidly revolving propeller hub and thence through additional slip connections to take care of the relatively slow axial rotary movement of each blade strut 10 during change of pitch of the blade, all in a manner which can be readily devised by those skilled in such art.

Reinforcing metal bulkheads 50 and 51 are rigidly fixed, as by riveting angle ears thereon, to the upper and lower sheaths 15 and 16 and to strut 10, and close the opening between these sheets adjacent the hub end thereof. In the form of blade shown in the drawings, the entire cavity between the leading edge indented portions 20 and 21 extending from bulkhead 50 to the tip 60 of the blade is filled with hard sponge rubber 55. Also the entire cavity between sheaths 15 and 16 at the trailing edge is filled with hard sponge rubber 56 from the bulkhead 51 to the blade tip 60. This sponge rubber filling composition 55 and 56 is inserted in place through the openings subsequently closed by bulkheads 50 and 51, and if so desired may be expanded and cured in situ under applied heat while the sheaths 15 and 16 are held in a suitable form or mold to maintain the desired air foil contour thereof.

In the form of blade shown in the drawings, the interior of strut 10 is also filled with hard rubber composition 57 from the outer tip thereof. This filling 57 may be removed from the hub portion outwardly to obtain the desired balance in the fully assembled blade. A central vent hole 58 extends the length of the filling 57. If so desired any one or more of the hard sponge rubber fillers 55, 56 and 57 may be omitted if such fillers are not needed to provide the desired rigidity to the blade.

While the embodiments of the present invention as herein disclosed, constitute preferred forms, it is to be understood that other forms might be adopted.

What is claimed is as follows:

1. An aircraft propeller blade comprising: a main strength-giving metal core member extending substantially the entire length of the blade, said core member having opposite sides of substantially constant chordwise width throughout its entire length, a metal sheath fixed to one side of said core and forming the major portion of the camber side of said blade, a second metal sheath fixed to the opposite side of said core and forming the major portion of the relatively flat side of said blade, the leading portions of said two metal sheaths forward of the core member being indented inwardly so as to be spaced inwardly from the leading edge contour of the air foil section of the blade, and a separately formed shell of relatively hard wear-resisting metal telescoped over said indented leading portions of said two metal sheaths and completing the air foil section of the leading edge of the blade.

2. An aircraft propeller blade comprising: a main strength-giving metal core member extending substantially the entire length of the blade, said core member having opposite sides of substantially constant width throughout its entire length, a sheet metal surface member fixed to one side of said core member and forming the camber surface of said blade with the exception of leading portions thereof forward of said core member, a second sheet metal surface member fixed to the opposite side of said core member and forming the relatively flat surface of said blade with the exception of leading portions of said blade forward of said core member, said first and second sheet metal surface members having their leading portions indented inwardly from the air foil section of the blade and having their forward margins rigidly fixed together over a substantial area of said blade to provide a more rigid interior structure for the blade, and a separately formed shell of hard wear-resisting metal telescoped over said indented leading portions and secured thereto to form the air foil section of the leading edge of the blade.

3. An aircraft propeller blade comprising: a main strength-giving metal core member extending substantially the entire length of the blade, said core member having opposite sides of substantially constant width throughout its entire length, a sheet metal surface member fixed to one side of said core member and forming the camber surface of said blade with the exception of leading portions of said blade forward of said core member, a second sheet metal surface member fixed to the opposite side of said core member and forming the relatively flat surface of said blade with the exception of leading portions of said blade forward of said core member, said first and second sheet metal surface members having their leading portions indented inwardly from the air foil section of the blade and having their forward margins rigidly fixed together over a substantial area thereof to provide a more rigid interior structure for the blade, and a separately formed shell of hard wear-resisting metal telescoped over said indented leading portions and secured thereto to form the air foil section of the leading edge of the blade, said separately formed shell having an electric heater element secured therein in good heat-conducting relation with its interior surface.

JOHN F. HAINES.
CLIFFORD B. WRIGHT.

References Cited in the file of this patent

UNITED STATES PATENTS

| Number | Name | Date |
| --- | --- | --- |
| 2,366,164 | Weick et al. | Jan. 2, 1945 |
| 2,460,351 | Hoffman et al. | Feb. 1, 1949 |
| 2,494,625 | Martin | Jan. 17, 1950 |